June 5, 1956     H. GREENBERG     2,749,364
SEPARATION OF ACIDS
Filed Feb. 16, 1954
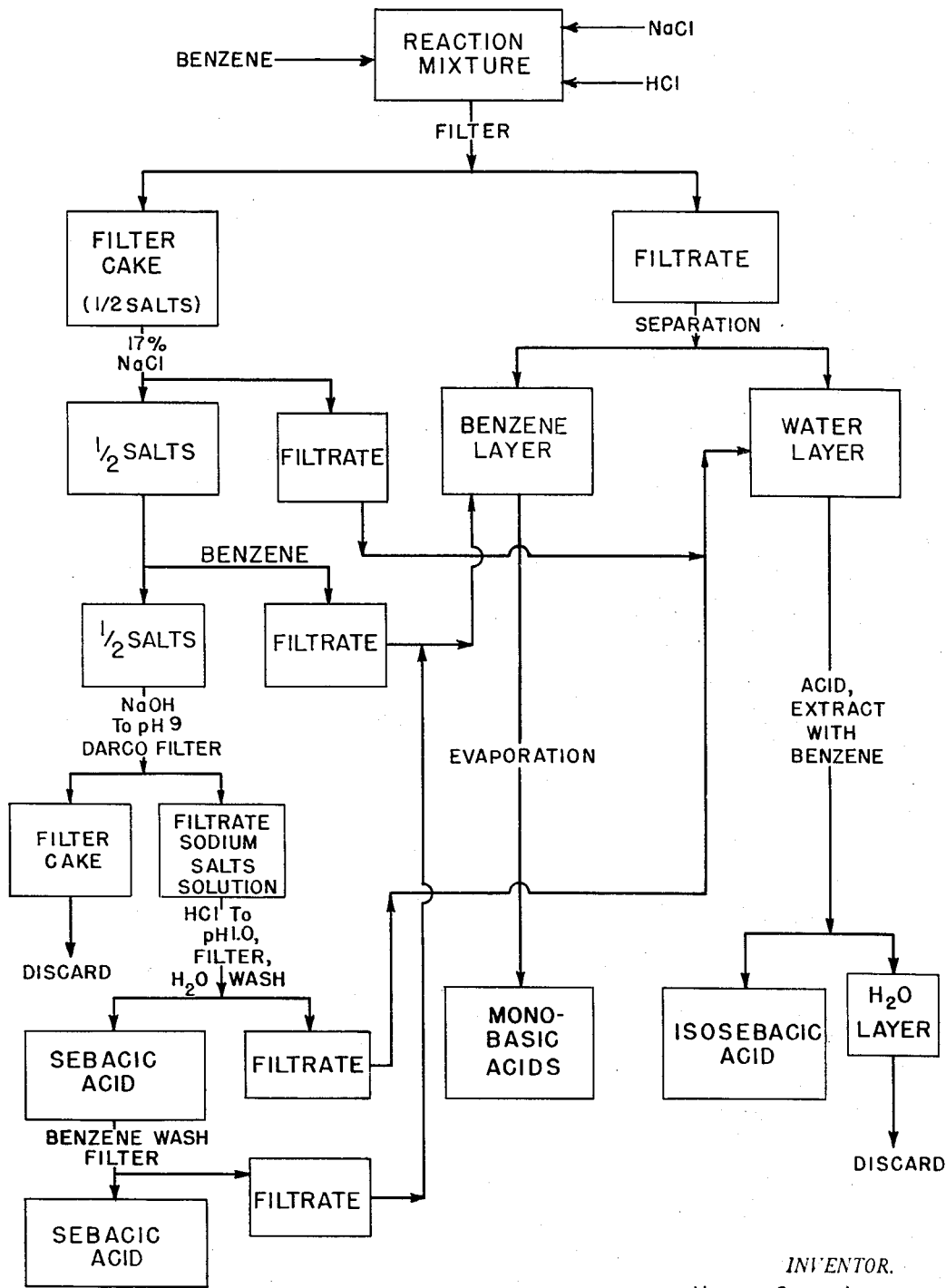
INVENTOR.
Harry Greenberg
BY E. Janet Berry United States Patent Office 2,749,364
Patented June 5, 1956

2,749,364

SEPARATION OF ACIDS

Harry Greenberg, Cincinnati, Ohio, assignor to National Distillers Products Corporation, New York, N. Y., a corporation of Virginia Application February 16, 1954, Serial No. 410,697

9 Claims. (Cl. 260—537)

This invention relates generally to a method for isolating and separating acids into relatively pure fractions and more particularly to a novel and highly effective method for recovering pure C–10 dibasic acids from reaction products containing isomeric mixtures of them.

It has recently been found that an aliphatic conjugated diolefin can be treated with finely dispersed sodium or potassium in a selected ether medium and in the presence of a relatively small amount of polycyclic aromatic hydrocarbon and/or a solid attrition agent at a temperature preferably below 0° C. to give a mixture of dimetallo derivatives of the dimerized diolefin. These dimetallo derivatives can then be carbonated at a temperature below 0° to give the corresponding salts of dicarboxylic acids in high yields and selectivities.

In the case of the initial reaction using sodium and butadiene, the product obtained comprises the disodium derivatives of the aliphatic isomeric octadienes. Studies of the structures of the saturated diacids arising therefrom after carbonation and hydrogenation indicate that mixtures of isomeric C–10 dicarboxylic acids are obtained. Thus, following final hydrogenation and acidification, the product mixture yields sebacic acid, 2-ethylsuberic acid, 2,2'-diethyl adipic acid, together with small amounts of other acids including monobasic carboxylic acids.

If other diolefins such as isoprene, dimethyl butadiene, the pentadienes and the like are used initially, the mixture of final products will vary accordingly. These mixtures will ordinarily be composed predominantly of C–10 to C–14 dibasic acids.

In the preferred type of operation, the butadiene and finely dispersed sodium are reacted in an attrition type apparatus such as a ball mill, with a selected solid attrition agent. This material is most conveniently solid sodium chloride. The disodiooctadienes formed are subsequently carbonated to the sodium salts of the unsaturated C–10 acids. Organic solvents are then removed and the solids are converted to an aqueous solution, which is preferably filtered prior to hydrogenation. A catalytic hydrogenation is then carried out to convert the sodium salts of unsaturated acids to completely saturated salts.

The resulting final aqueous reaction mixture contains varying amounts of isomeric C–10 dicarboxylic acids including the linear isomer, sebacic acid as sodium salts. It also contains the sodium salts of the valuable branched-chain, C–10 acids as well as certain monobasic acids of varying molecular weights including C–5, C–9, and higher. There is also present relatively smaller amounts of impurities such as hydrogenating catalyst, condensed polymeric acids, and the like. The solution also contains about 15% sodium chloride. It is this aqueous mixture which serves as starting material for the separation method of this invention.

It is usually desirable to carry out an initial "test" titration in order to determine accurately the free alkali and the total organic acid content. This information is of value in order to establish exact amounts of mineral acid to be added for sharp separations, and greater purity of final products.

The invention will be better understood by reference to the accompanying general flow plan. Following the outlines of the flow plan, the total aqueous reaction mixture is agitated at a temperature of about 15° C. with approximately 20% by volume of the aqueous mixture of benzene, toluene, xylenes, or other inert hydrocarbon solvent of the aromatic type. Concentrated hydrochloric acid (12 N) is also added. The amount may vary between 5% and 10% by volume of aqueous mixture. In any event, the amount added should be approximately equivalent to one mole of hydrogen ion per mole of dicarboxylic acid present. Any strong mineral acid may be used such as sulfuric acid. The amount of acid added precipitates essentially all of the sebacic acid as the half sodium salt, together with some of the half sodium salts of other dibasic acids and practically all of the sodium salts of the monobasic acids. Addition of too much acid causes excessive precipitation of the half salts of dibasic acids other than sebacic acid and consequently causes poor ultimate separation. Following addition of the benzene and acid, the mixture is saturated with sodium chloride by the addition of the solid material. Agitation is continued for sufficient time to permit the mixture to come to equilibrium.

The mixture is then subjected to filtration to give a residue filter cake and a two-phase filtrate. The filter cake consists principally of the half sodium salts of sebacic acid together with minor amounts of the half salts of the other dicarboxylic acids and the free monocarboxylic acids. Washing of the crude filter cake with half saturated aqueous sodium chloride gives a filtrate which can be added to the initial filtrate. The cake can also be washed with a small amount of benzene or other solvent. This washing is likewise added to the original filtrate.

The impure filter cake, which is mainly the half salt of sebacic acid, is suspended in about 5 to 10 times its weight of water and sufficient caustic, preferably concentrated sodium hydroxide, is added to give a pH of about 12. Acid is then added to adjust the pH further to about 8.5–9.0. This may cause precipitation of a small amount of impurities. If desired, a small amount of activated carbon can then be added and the solution filtered. The clear filtrate containing disodium sebacate is acidified to a pH of about 1.0, filtered, and the filter cake washed with water until the washings show no test for chloride ion. This yields relatively pure sebacic acid, having only a trace of impurities.

If desired, this solid cake can be further purified by an additional washing with benzene, or other organic solvent. A small amount of benzene soluble material is recovered from these washings.

Operating in this manner, the dry sebacic acid recovered represents a 90–95% recovery of the total sebacic acid present in the original reaction mixture.

The two phase filtrate from the original filtration was separated into two layers. The organic layer contains most of the monobasic acids as well as other benzene soluble materials produced as by-products during the reaction. The benzene washings from purification of the sebacic acid can be added to the benzene fraction. If desired, this layer can be washed to remove water soluble impurities, dried and evaporated to remove solvent. Further purification steps can be carried out, if desired, on the monobasic acids.

The aqueous layer can be likewise combined with aqueous wash fractions. This aqueous mixture contains substantially all of the isomeric C–10 diacids other than sebacic acid. Acidification precipitates the free acids, and extraction with benzene removes the organic diacids. The benzene solution is then washed and evaporated to a solid residue. Substantially all of the isomeric C-10 diacids are thereby recovered. They can be further purified, if desired.

The invention will be further described in detail by the following example although it is not intended to limit it specifically thereto. The parts are by weight unless otherwise stated.

*Example*

This experiment was carried out using an aqueous solution of the sodium salts of the total acids including both dibasic and monobasic acids of the organic series. It was obtained by the above described series of reactions including a final catalytic hydrogenation. The final solutional also contained about 15% sodium chloride.

There was used 548 parts of the mixture containing about 101 parts of acids as determined by preliminary titration experiments. This solution was stirred, with external cooling to maintain a temperature of about 15° C., during the addition of 90 parts of benzene and 36 parts of 12 N HCl to precipitate substantially all of the sebacic acid as the half sodium salt. Small amounts of other dibasic acids and monobasic acids also precipitated at the same time and contaminated the solid. Following the addition of the acid, approximately 100 parts of sodium chloride were added to saturate the solution with respect to this material. Continuous stirring was maintained for about 1 hour.

Filtration gave a solid cake of the half salts of sebacic acid as the filter cake and a two phase filtrate; one consisting of a benzene layer and the other, an aqueous layer.

The solid filter cake was washed with cold 17% sodium chloride until the washings were clear. Finally, the cake was washed with benzene. The cake of impure half salt of sebacic acid was suspended in about 400 parts of water to which was added sufficient concentrated sodium hydroxide to bring all solids into solution at a pH of 12. Hydrochloric acid was added to bring the pH to about 9.0. A small amount of activated carbon (1 to 2 parts) and filter aid were added and the mixture filtered.

The clear solution of disodium sebacate was then acidified to a pH of 1, filtered, and washed with water until the washings gave no chloride test with silver nitrate. The cake was washed with a little benzene to improve the purity.

The sebacic acid, when dry (32.6 parts), represented about 95% of the total sebacic acid which was present in the original mixture.

The filtrate from the first filtration, plus the total washings from the sebacic acid purification, were separated into two main fractions; an aqueous layer and a benzene layer. The benzene fraction contained almost all of the monobasic acids. This was combined with later obtained benzene wash fractions. The combined fractions were thereafter dried with sodium sulfate and/or washed with a little water to remove inorganic salts. The solvent was removed by distillation under reduced pressure. The weight of monobasic acids recovered was 6.3 parts.

The aqueous layer was acidified with mineral acid to about pH 2 and extracted with benzene. The benzene containing the extracted $C_{10}$ dibasic acids was then washed with water to remove mineral acid and inorganic salts. After drying, the solvent was removed under reduced pressure and a solvent free residue of isomeric $C_{10}$ dicarboxylic acids was recovered. The recovered acids weighed 59 parts.

Total materials recovered:

| | Parts |
|---|---|
| Sebacic acid | 32.6 |
| Monobasic acids | 6.3 |
| Isomeric $C_{10}$ diacids | 59.0 |
| Benzene insoluble imp | 1.0 |
| Total | 98.9 |
| Total starting acids | 101.0 |

What is claimed is:

1. A process for separation and purification of acidic compounds from an aqueous mixture containing alkali metal salts of monobasic and dibasic acids including substantial amounts of such salts of sebacic acid and other isomeric C-10 acids obtained by hydrogenation of a mixture resulting from carbonation of dialkali metal octadienes which includes the steps of diluting said aqueous mixture with an inert aromatic hydrocarbon liquid, adding mineral acid to convert substantially all of the sebacic acid to the monosodium salt, saturating said mixture with sodium chloride, filtering said mixture, recovering substantially pure sebacic acid from the resulting filter cake, separating the resulting filtrate into an aqueous layer and an aromatic hydrocarbon liquid layer, recovering monobasic acids from said hydrocarbon layer, and recovering a mixture of C-10 isomeric dibasic acids other than sebacic acid from said aqueous layer.

2. A process for separation and purification of acids from an aqueous mixture containing sodium salts of monobasic acids, and substantial amounts of sodium salts of dibasic acids obtained by hydrogenation of a mixture resulting from carbonation of disodiooctadienes, which comprises the steps of adding to said aqueous mixture a benzene hydrocarbon liquid, adding mineral acid to convert substantially all the sebacic acid to the monosodium salt, saturating said mixture with salt, filtering said mixture, washing the filter cake with salt solution, recovering and purifying sebacic acid from the resulting filter cake, separating the resulting filtrate into an aqueous layer and a benzene hydrocarbon liquid layer, recovering monobasic acids from said benzene hydrocarbon liquid layer, and recovering and purifying a mixture of C-10 isomeric dibasic acids other than sebacic acid from said aqueous layer.

3. A process according to that described in claim 2 in which the hydrocarbon liquid is benzene.

4. A process for separation and purification of acids and diacids from an aqueous mixture containing sodium salts of monobasic acids, and substantial amounts of sodium salts of dibasic acids including sebacic acid and isomeric C-10 acids, said mixture of salts having been obtained by hydrogenation of a mixture resulting from carbonation of disodiooctadienes, which comprises the steps of diluting said aqueous mixture with about 20% by volume of benzene, adding hydrochloric acid to convert substantially all the sebacic acid to the monosodium salt, saturating said mixture with solid sodium chloride at 15° C., filtering said mixture, washing the resulting filter cake with about 17% aqueous sodium chloride solution, dissolving said filter cake in aqueous sodium hydroxide solution, recovering sebacic acid from said solution, separating the filtrate into a benzene layer and an aqueous layer, recovering monobasic acids from said benzene layer, and recovering a mixture of C-10 isomeric dibasic acids other than sebacic acid from said aqueous layer.

5. A process for separation and purification of acids and diacids from an aqueous mixture containing sodium salts of monobasic acids, substantial amounts of sodium salts of dibasic acids and sodium chloride, and obtained by hydrogenation of a mixture resulting from carbonation of disodiooctadienes, which comprises the steps of diluting said aqueous mixture with about 20% by volume of benzene, adding hydrochloric acid to convert substantially all the sebacic acid to the monosodium salt, saturating said mixture with solid sodium chloride at 15° C., filtering said mixture, washing the resulting filter cake with about 17% aqueous sodium chloride solution, dissolving said filter cake in aqueous sodium hydroxide solution, recovering sebacic acid from said solution, separating the filtrate into a benzene layer and an aqueous layer, recovering monobasic acids from said benzene layer, and recovering a mixture of C-10 isomeric dibasic acids other than sebacic acid from said aqueous layer.

6. A process for separation and purification of sebacic acid from an aqueous mixture containing alkali metal salts of monobasic and dibasic acids including substantial amounts of said salts of sebacic acid and other isomeric C-10 acids and obtained by hydrogenation of a mixture resulting from carbonation of dialkali metal octadienes which includes the steps of diluting said aqueous mixture with an inert liquid aromatic hydrocarbon, adding mineral acid to convert substantially all of the sebacic acid to the monosodium salt, saturating said mixture with sodium chloride, separating precipitated solids from the resulting mixture, and recovering substantially pure sebacic acid from the precipitated solids.

7. A process for separation and purification of sebacic acid from an aqueous mixture containing sodium salts of monobasic acids and substantial amounts of sodium salts of dibasic acids obtained by hydrogenation of a mixture resulting from carbonation of disodiooctadienes, which comprises the steps of adding to said aqueous mixture a liquid benzene hydrocarbon, adding mineral acid to convert substantially all of the sebacic acid in the aqueous mixture to the monosodium salts of sebacic acid, saturating the resulting mixture with salt, filtering the resulting saturated mixture, and recovering substantially pure sebacic acid from the resulting filter cake.

8. A process, as defined in claim 7, wherein the liquid benzene hydrocarbon is benzene, and the mineral acid is hydrochloric acid.

9. A process, as defined in claim 8, wherein the filter cake is washed with an aqueous sodium chloride solution, the resulting washed filter cake is dissolved in aqueous sodium hydroxide solution, and sebacic acid is recovered from the resulting sodium hydroxide solution.

No references cited.